(12) United States Patent
Kim

(10) Patent No.: US 12,415,465 B2
(45) Date of Patent: Sep. 16, 2025

(54) DOOR HANDLE OF A VEHICLE

(71) Applicants: HYUNDAI MOTOR COMPANY, Seoul (KR); KIA CORPORATION, Seoul (KR)

(72) Inventor: Untae Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 131 days.

(21) Appl. No.: 18/196,055

(22) Filed: May 11, 2023

(65) Prior Publication Data

US 2024/0017679 A1 Jan. 18, 2024

(30) Foreign Application Priority Data

Jul. 18, 2022 (KR) .......................... 10-2022-0088025

(51) Int. Cl.
| | |
|---|---|
| *B60R 11/04* | (2006.01) |
| *B60R 11/00* | (2006.01) |
| *E05B 85/10* | (2014.01) |
| *G02B 27/00* | (2006.01) |
| *G03B 17/56* | (2021.01) |

(52) U.S. Cl.
CPC ............ *B60R 11/04* (2013.01); *E05B 85/107* (2013.01); *G02B 27/0006* (2013.01); *G03B 17/561* (2013.01); *B60R 2011/004* (2013.01)

(58) Field of Classification Search
CPC . B60R 11/04; B60R 2011/004; E05B 85/107; G02B 27/0006; G03B 17/561

USPC .......................................................... 396/428
See application file for complete search history.

(56) References Cited

U.S. PATENT DOCUMENTS

| | | | | |
|---|---|---|---|---|
| 9,476,231 | B2 * | 10/2016 | Park | E05B 81/20 |
| 10,179,571 | B1 * | 1/2019 | Matesic | G03B 17/08 |
| 11,173,839 | B2 * | 11/2021 | Wilson | H04N 7/18 |
| 11,525,292 | B2 | 12/2022 | Jeong | |
| 2008/0072393 | A1 * | 3/2008 | Tanaka | A47L 1/02 |
| | | | | 15/250.03 |
| 2011/0170305 | A1 * | 7/2011 | Tanaka | E05B 17/10 |
| | | | | 16/412 |
| 2014/0223975 | A1 * | 8/2014 | Park | E05B 81/20 |
| | | | | 292/144 |
| 2016/0130845 | A1 * | 5/2016 | Park | E05B 77/06 |
| | | | | 292/336.3 |
| 2018/0272958 | A1 * | 9/2018 | Brouwer | G01S 7/027 |
| 2019/0329719 | A1 * | 10/2019 | Brouwer | B60S 1/56 |
| 2019/0329720 | A1 * | 10/2019 | Brouwer | H04N 23/51 |

(Continued)

FOREIGN PATENT DOCUMENTS

| | | | | |
|---|---|---|---|---|
| CN | 211313755 U | * | 8/2020 | |
| EP | 3437930 A1 | * | 2/2019 | ............... B60R 1/00 |

(Continued)

*Primary Examiner* — Stephanie E Bloss
*Assistant Examiner* — Kevin C Butler
(74) *Attorney, Agent, or Firm* — Lempia Summerfield Katz LLC

(57) ABSTRACT

A door handle of a vehicle includes a handle housing installed on a door of the vehicle and on which an insertion groove is formed, a handle inner member inserted into the insertion groove of the handle housing and operable to protrude from the insertion groove, and a camera module installed on the handle inner member to be exposed when the handle inner member protrudes.

17 Claims, 17 Drawing Sheets

(56) References Cited

U.S. PATENT DOCUMENTS

2022/0154500 A1* 5/2022 Jeong .................. E05B 77/42
2024/0017679 A1* 1/2024 Kim .................... E05B 85/103

FOREIGN PATENT DOCUMENTS

| | | | | | |
|---|---|---|---|---|---|
| JP | 4882370 | B2 | * | 2/2012 | ............ E05B 81/78 |
| JP | 2012111390 | A | * | 6/2012 | |
| JP | 2022533489 | A | * | 7/2022 | ............... B60J 5/04 |
| KR | 19980021354 | A | * | 6/1998 | ............... E05B 1/00 |
| KR | 100461412 | B1 | * | 3/2004 | |
| KR | 20050106602 | A | * | 11/2005 | ............... B60J 5/04 |
| KR | 20080072393 | A | * | 8/2008 | ............... G09G 3/20 |
| KR | 101173839 | B1 | * | 6/2009 | ............... G02B 5/02 |
| KR | 20100021922 | A | * | 2/2010 | ............... B60J 5/00 |
| KR | 20110011932 | U | | 12/2011 | |
| KR | 101220593 | B1 | * | 6/2012 | ............... B60J 5/04 |
| KR | 20180102462 | A | | 9/2018 | |
| KR | 20210128327 | A | | 10/2021 | |
| KR | 20220154500 | A | * | 11/2022 | ............... G06Q 50/04 |
| WO | WO-2021210713 | A1 | * | 10/2021 | ............ E05B 77/42 |

* cited by examiner

DOOR HANDLE OF A VEHICLE

CROSS-REFERENCE TO RELATED APPLICATION(S)

This application claims the benefit of and priority to Korean Patent Application No. 10-2022-0088025, filed on Jul. 18, 2022, the entire contents of which are incorporated herein by reference.

FIELD

The present disclosure relates to a door handle of a vehicle, and more particularly, to a door handle installed on the door of the vehicle and protruding from the door manually or automatically.

BACKGROUND

The statements in this section merely provide background information related to the present disclosure and may not constitute prior art.

Generally, a vehicle is provided with one or more doors for occupants to get in and out of the vehicle. Such doors include external door handle for opening and closing the doors from the outside and an internal door handle for opening and closing the doors from the inside.

For example, an external door handle is installed on an outer panel of the door to protrude to the outside of the vehicle, and may have a shape that may be easily gripped by an occupant. However, as the external door handle protrudes to the outside of the vehicle, the external door handle has a disadvantage in that it hinders the appearance of the vehicle, causes noise due to air resistance when driving, and reduces driving performance.

Accordingly, a flush door handle has recently been developed. Such a flush door handle is accommodated in an outer panel of the door while the vehicle is parking or driving, and the flush door handle pops out and protrudes from the outer panel of the door when the door is opened/closed. The flush door handle is equipped with a motor and may be operated automatically.

SUMMARY

An embodiment of the present disclosure provides a door handle of a vehicle equipped with a camera capable of photographing surroundings of the vehicle. In particular, the camera is provided on a flush door handle of the vehicle.

Additional embodiments of the disclosure are set forth in part in the description which follows and, in part, should be understood from the description, or may be learned by practice of the disclosure.

In accordance with an embodiment of the present disclosure, a door handle of a vehicle includes a handle housing installed on a door of the vehicle and an insertion groove is formed in the handle housing. The door handle further includes a handle inner member inserted into the insertion groove of the handle housing and operable to protrude from the insertion groove, and a camera module installed on the handle inner member to be exposed to an outside of the handle housing when the handle inner member protrudes from the insertion groove.

The camera module may be rotatably installed on the handle inner member.

The door handle may further include a motor module operable to rotate the camera module.

The motor module may further include a motor body, a link screw connected to the motor body and rotated by an operation of the motor body, and a screw bar. One end of the screw bar is connected to the camera module and the other end of the screw bar is connected to the link screw, and thus the screw bar may move according to a rotation of the link screw.

A position at which the screw bar is coupled to the camera module may be disposed to be spaced apart from a rotation axis of the camera module by a predetermined distance.

A camera mounting groove to mount the camera module and a motor insertion groove to receive the motor module may be formed in the handle inner member.

The handle inner member may have a predetermined length, and the camera module may be disposed on one end of the handle inner member.

The handle inner member may be further configured to operate to be protruded from the insertion groove in response to a speed of the vehicle when exceeding a predetermined speed.

The handle inner member may be further configured to protrude from the insertion groove or maintain in an inserted state according to a signal of a turn signal switch of the vehicle.

The handle inner member may be further configured to protrude from the insertion groove or maintain in an inserted state according to a position of a shift lever of the vehicle.

The door handle may further include a handle outer member coupled to the handle inner member in such a way that the camera module is not externally exposed thereto.

The handle outer member may further include an outer body in which a groove is formed to cover the handle inner member and an outer rotation protrusion formed to protrude from an outer surface of the outer body and caught on the handle housing. In particular, the outer body is rotated around the outer rotation protrusion within the handle housing. In other words, the outer rotation protrusion functions as a rotation axis of the outer body.

The handle inner member may operate to be protruded from the insertion groove as the outer body rotates within the handle housing.

The door handle may further include a cleaner installed inside the handle housing and configured to clean a lens of the camera module.

The camera module may be installed in the handle inner member so that the lens of the camera module is rotated in a state in which the lens of the camera module is in contact with the cleaner.

The handle inner member may be further configured to be rotated and protruded from the handle housing so as to expose the camera module.

The handle inner member may be further configured to be slid and protruded from the handle housing so as to expose the camera module.

The handle inner member may further include a handle hole into which a hand of a user is inserted.

BRIEF DESCRIPTION OF THE DRAWINGS

In order that the disclosure may be well understood, there are now described various forms thereof, given by way of example, reference being made to the accompanying drawings, in which.

DETAILED DESCRIPTION

Figure 1:
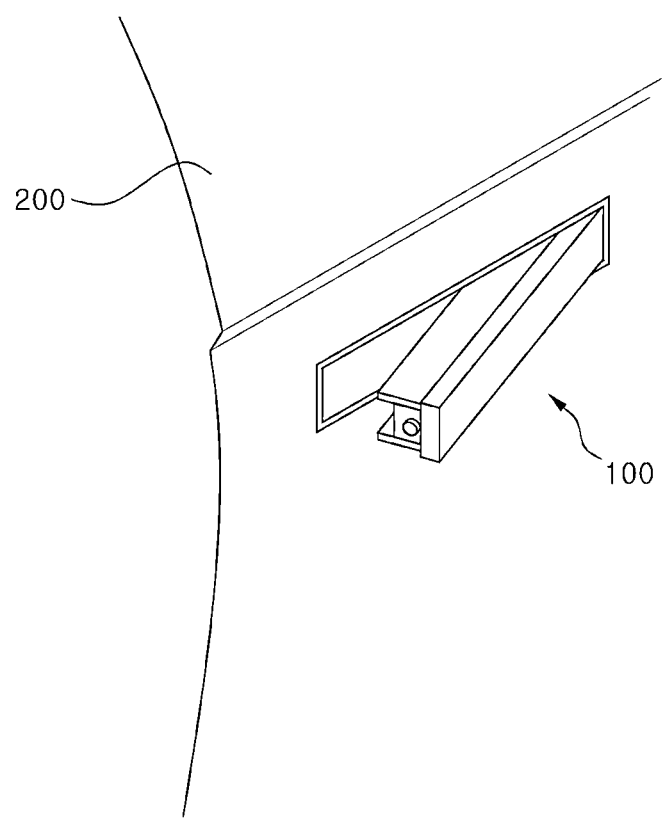
FIG. 1 is a view illustrating a state in which a door handle of a vehicle installed on a door of the vehicle according to an embodiment of the present disclosure.

Reference is made below in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the disclosure are described in detail with reference to the accompanying drawings.

FIGS. 1 to 8 illustrate a door handle 100 of a vehicle according to an embodiment of the present disclosure. The door handle 100 is installed on a door 200 of the vehicle and includes a handle housing 110, a handle inner member 120, a camera module 130, a motor module 140, a handle outer member 150, and a cleaner 160.

The handle housing 110 is inserted into the door 200 of the vehicle and coupled to the door 200. In particular, the handle housing 110 is provided with an insertion groove 112 into which the handle inner member 120 and the handle outer member 150 may be inserted. In one embodiment, the handle housing 110 has a substantially rectangular parallelepiped shape, and the insertion groove 112 is formed on one surface of the handle housing 110. When the handle housing 110 is inserted into the door 200 of the vehicle, the surface on which the insertion groove 112 is formed may be disposed to be exposed to an outer panel of the door 200.

The handle inner member 120 is inserted into the insertion groove 112 of the handle housing 110, and the camera module 130 and the motor module 140 may be mounted on the handle inner member 120. In one embodiment, the handle inner member 120 may include an inner body 122, and a camera mounting groove 124 and a motor insertion groove 126 may be formed in the inner body 122.

Figure 4:
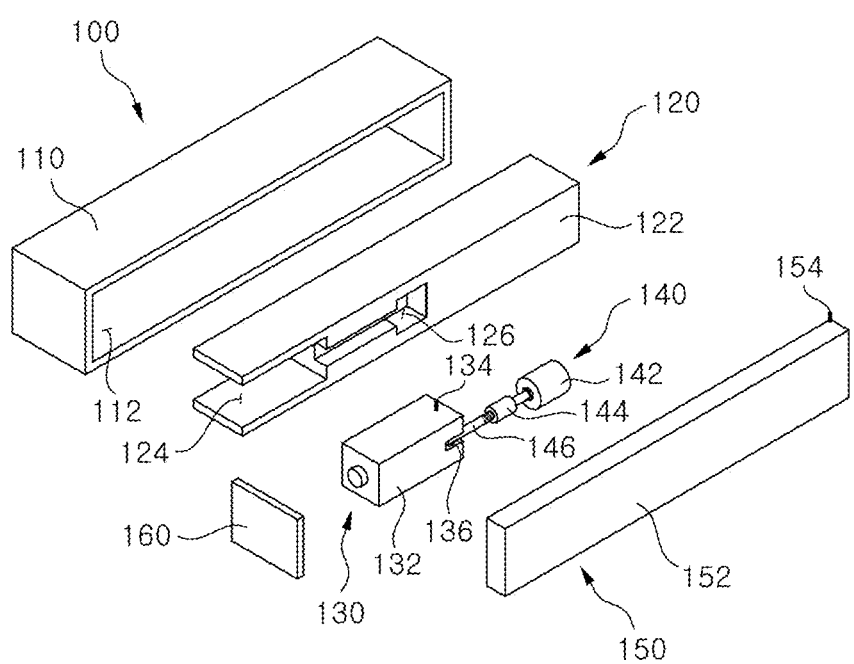
FIG. 4 is an exploded view illustrating a door handle of the vehicle according to an embodiment of the present disclosure.
Figure 5:
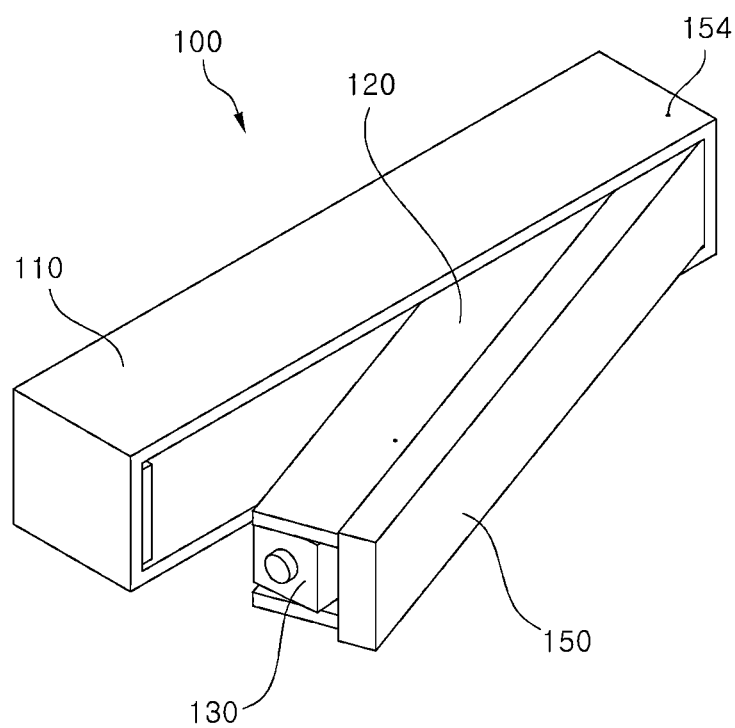
FIG. 5 is a view illustrating a state in which a camera disposed on a door handle of the vehicle is rotated according to an embodiment of the present disclosure.
Figure 6:
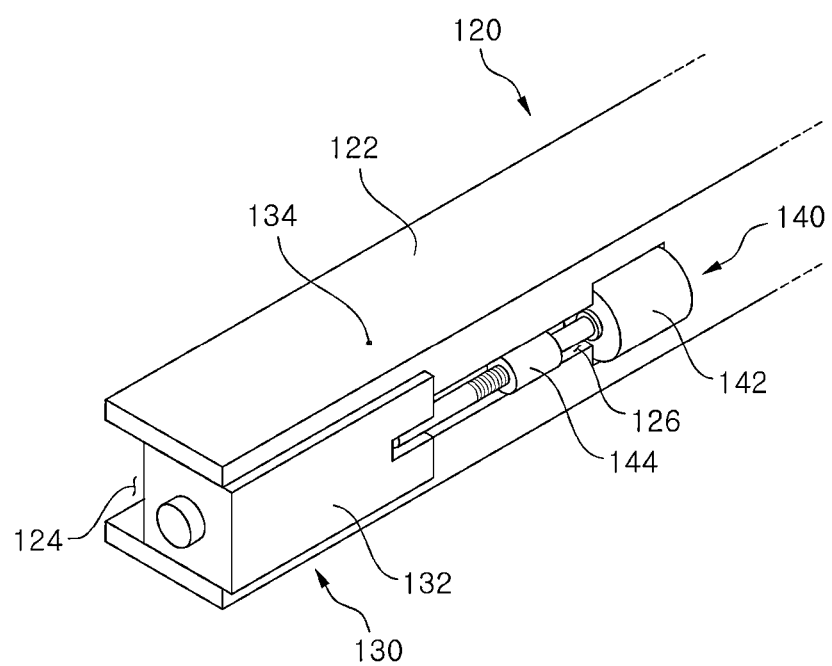
FIG. 6 is a view illustrating a state in which a camera of a door handle of the vehicle is installed according to an embodiment of the present disclosure.
Figure 7:
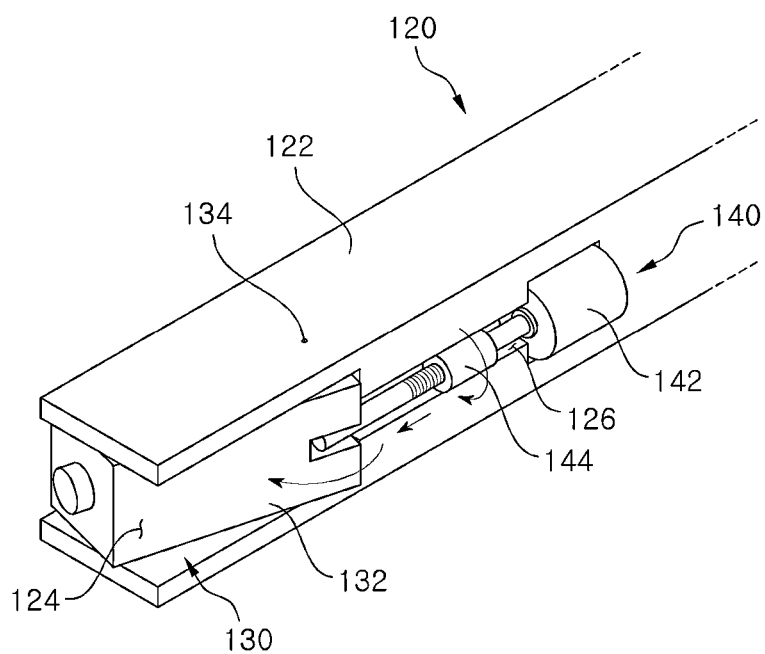
FIG. 7 is a view illustrating a state in which a camera of a door handle of the vehicle is rotated according to an embodiment of the present disclosure.

The inner body 122 has a substantially rectangular parallelepiped shape and may be inserted into the insertion groove 112 of the handle housing 110. The camera mounting groove 124 is formed at one end of the inner body 122. Referring to FIG. 4, the camera mounting groove 124 may be open on three sides at the end of the inner body 122. In one embodiment, the camera mounting groove 124 is formed by two plates disposed at one end of the inner body 122. In other words, the camera mounting groove 124 is formed between the two plates which are spaced apart from each other. The camera module 130 may be installed rotatably at a predetermined angle in the camera mounting groove 124.

Furthermore, the motor insertion groove 126 is formed in the inner body 122. The motor insertion groove 126 is formed on one surface of the inner body 122 and extends from the camera mounting groove 124. The motor module 140 connected to the camera module 130 may be inserted into the motor insertion groove 126.

The camera module 130 may be coupled to the inner body 122 and may be rotated and operated by driving the motor module 140. The camera module 130 may include a camera body 132 and a camera rotation protrusion 134.

The camera body 132 may be operated by a power supplied from the outside, and may be rotatably coupled to the camera mounting groove 124 of the inner body 122. The camera body 132 may be operated all the time, but may be operated by receiving power when the handle inner member 120 protrudes from the handle housing 110.

In addition, a screw groove 136 may be formed in the camera body 132. The screw groove 136 may be disposed at a rear part of the camera body 132 which is opposite to a front part at which lens of the camera body 132 is disposed. A screw bar 146 of the motor module 140 may be coupled to the screw groove 136. The screw groove 136 may be disposed to be biased toward one side from the rear of the camera body 132.

The camera rotation protrusion 134 may have a shape protruding from the camera body 132 in both lateral directions. The camera rotation protrusion 134 may be disposed to be caught in the camera mounting groove 124 formed in the inner body 122 of the handle inner member 120, and accordingly, the camera body 132 may be rotated in the camera mounting groove 124 by using the camera rotation protrusion 134 as a rotation axis.

Herein, the camera rotation protrusion 134 may be disposed at a position spaced apart from a position where the screw groove 136 is formed by a predetermined distance.

The motor module 140 may be operated by power supplied from the outside, and may allow the camera body 132 to be rotated. The motor module 140 may include a motor body 142 and a link screw 144.

The motor body 142 is operated by power supplied from the outside, and as the motor body 142 is operated, the link screw 144 may be rotated.

The link screw 144 is rotated by the operation of the motor body 142, and the screw bar 146 that moves according to the rotation of the link screw 144 may be disposed therein. The screw bar 146 has a predetermined length, and one end thereof is rotatably coupled to the screw groove 136 formed in the camera body 132 and the other end thereof is coupled to the link screw 144.

Because a thread is formed at the other end of the screw bar 146, as the link screw 144 is rotated, the screw bar 146 may be moved in a longitudinal direction by the rotation of the link screw 144. Accordingly, as the screw bar 146 moves, a pushing or pulling force may be applied to the camera body 132. Herein, the screw groove 136 formed in the camera body 132 is formed to be biased toward one rear side of the camera body 132, and the positions of the camera rotation protrusion 134 and the screw groove 136 are spaced apart from each other, so that the camera body 132 may be rotated in a predetermined angle range with the camera rotation protrusion 134 as a rotation axis by a force generated when the screw bar 146 is moved in the longitudinal direction. In other words, the camera rotation protrusion 134, which is the rotation axes of the camera body 132, and the screw bar 146 are spaced apart, so that the camera body 132 may be rotated along the rotation axis.

At this time, the rotation direction of the link screw 144 may change according to a current of the electric power supplied to the motor body 142. For example, the screw bar 146 may be moved in one of both directions in the longitudinal direction according to the rotation direction of the link screw 144.

The handle outer member 150 is coupled to the handle inner member 120 to cover the handle inner member 120 so that the camera module 130 and the motor module 140 coupled to the handle inner member 120 are not exposed to the outside. The handle outer member 150 may include an outer body 152 and an outer rotation protrusion 154.

The outer body 152 has a groove into which the handle inner member 120 may be inserted, and may have a substantially rectangular parallelepiped shape. Even though the outer body 152 is coupled to the handle inner member 120, the camera module 130 which is coupled to the handle inner member 120 may be exposed to outside.

The outer rotation protrusion 154 may have a shape protruding from the outer body 152 in both lateral directions. The outer rotation protrusion 154 may be disposed to be caught in the handle housing 110, and accordingly, the outer body 152 may be rotated in the handle housing 110 by using the outer rotation protrusion 154 as a rotation axis. In other words, the handle outer member 150 and the handle inner member 120 may be inserted into the insertion groove 112 formed in the handle housing 110 in a coupled state.

Figure 2:
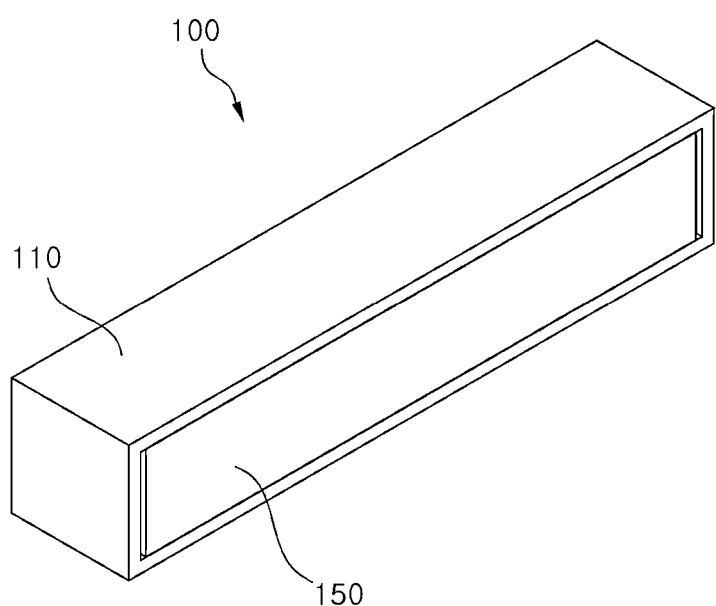
FIG. 2 is a view illustrating a door handle of the vehicle according to an embodiment of the present disclosure.
Figure 3:
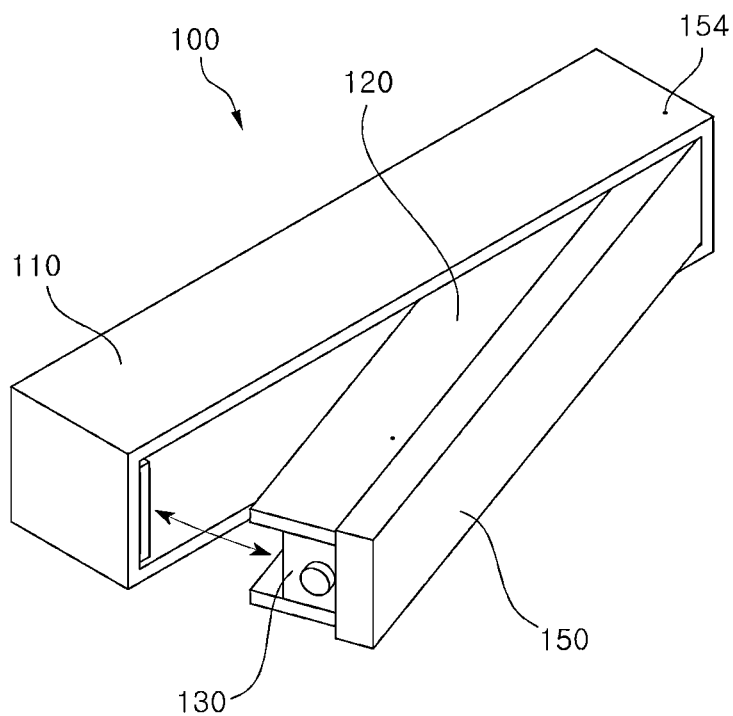
FIG. 3 is a view illustrating a state in which a door handle of the vehicle pops out according to an embodiment of the present disclosure.

In other words, as shown in FIGS. 2 and 3, the handle outer member 150 and the handle inner member 120 may be operated to be inserted or protruded from the handle housing 110 by rotating around the outer rotation protrusion 154 of the handle outer member 150 in a coupled state. Herein, the handle inner member 120 may be manually or electrically inserted or protruded from the handle housing 110.

In an embodiment, although not shown separately, a switch for electronically opening and closing the door 200 of the vehicle may be disposed on the inner handle. Alternatively, a switch configured for opening the door 200 of the vehicle when a user applies force to the inner handle in an outward direction while the handle outer member 150 protrudes from the handle housing 110 may be disposed on the handle housing 110.

The cleaner 160 may be disposed at one end of the insertion groove 112 of the handle housing 110. The cleaner 160 is disposed to clean the lens of the camera body 132, and a sponge or the like may be used to remove foreign substances attached to the lens of the camera body 132.

The cleaner 160 is disposed in the handle housing 110 so that the handle inner member 120 may be maintained in contact with the lens of the camera body 132 in a state in which the handle inner member 120 is inserted into the handle housing 110. Accordingly, the lens of the camera body 132 may be cleaned while the handle inner member 120 operates to be inserted or protruded from the handle housing 110.

Figure 8A:
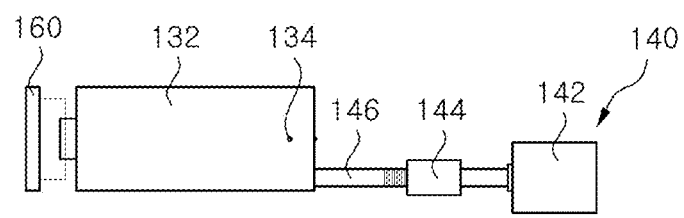
FIGS. 8A to 8C are views illustrating an operation for cleaning a camera of a door handle of the vehicle according to an embodiment of the present disclosure.
Figure 8B:
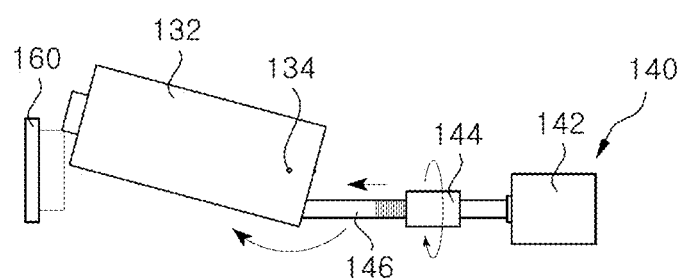
Figure 8C:
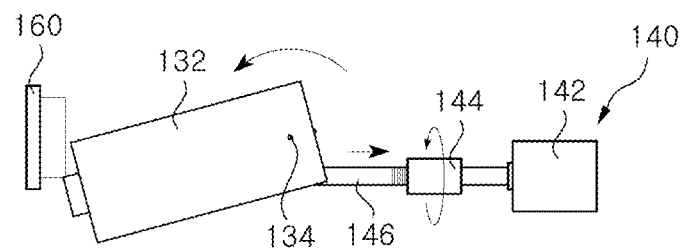
Figure 9:
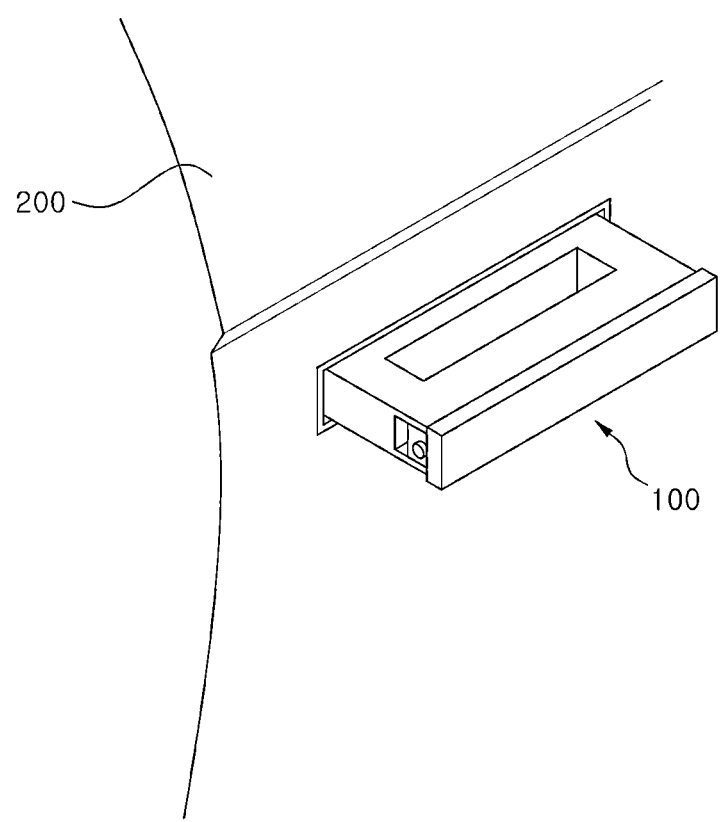
FIG. 9 is a view illustrating a state in which a door handle of a vehicle according to another embodiment of the present disclosure is installed on a door of the vehicle.
Figure 10:
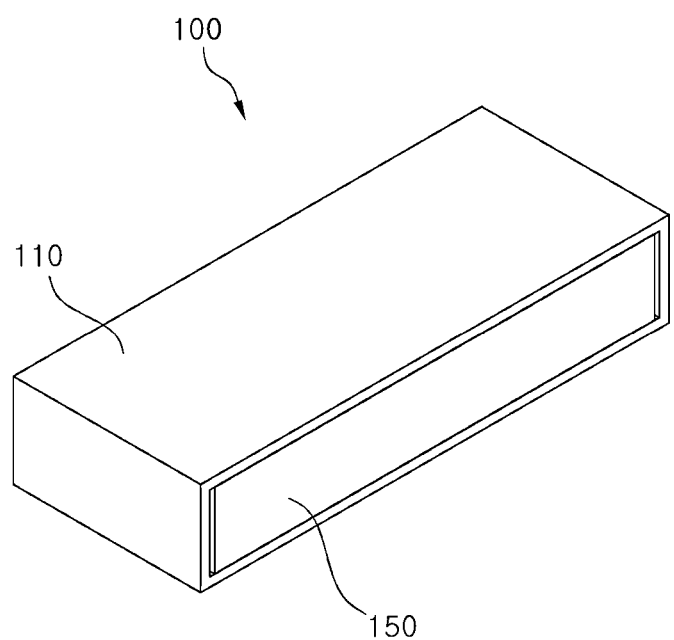
FIG. 10 is a view illustrating a door handle of the vehicle according to another embodiment of the present disclosure.
Figure 11:
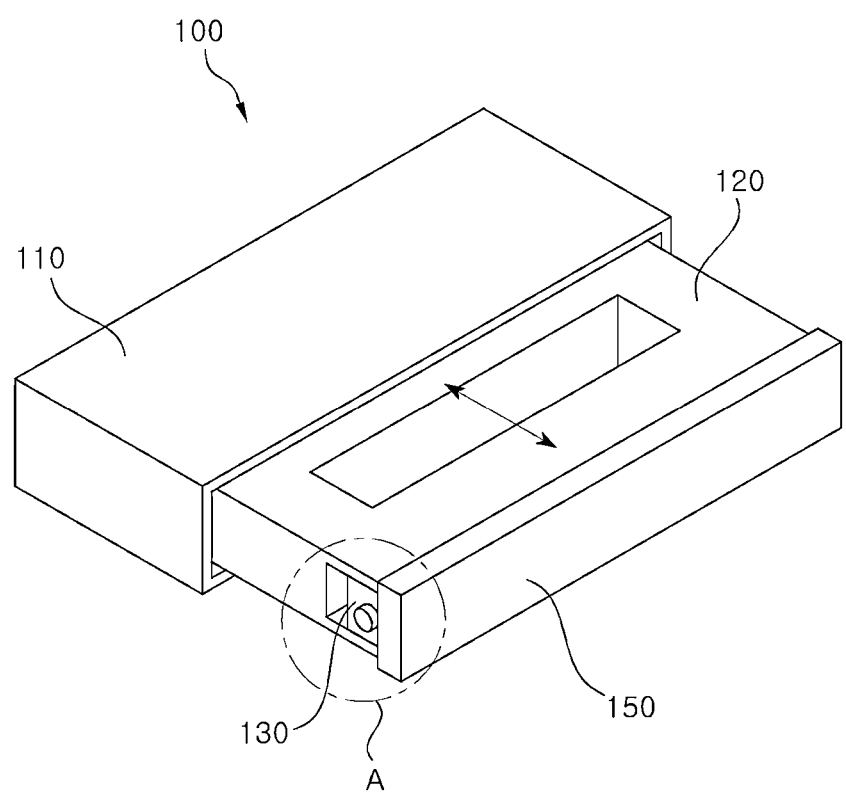
FIG. 11 is a view illustrating a state in which a door handle of the vehicle according to another embodiment of the present disclosure pops out.
Figure 12:
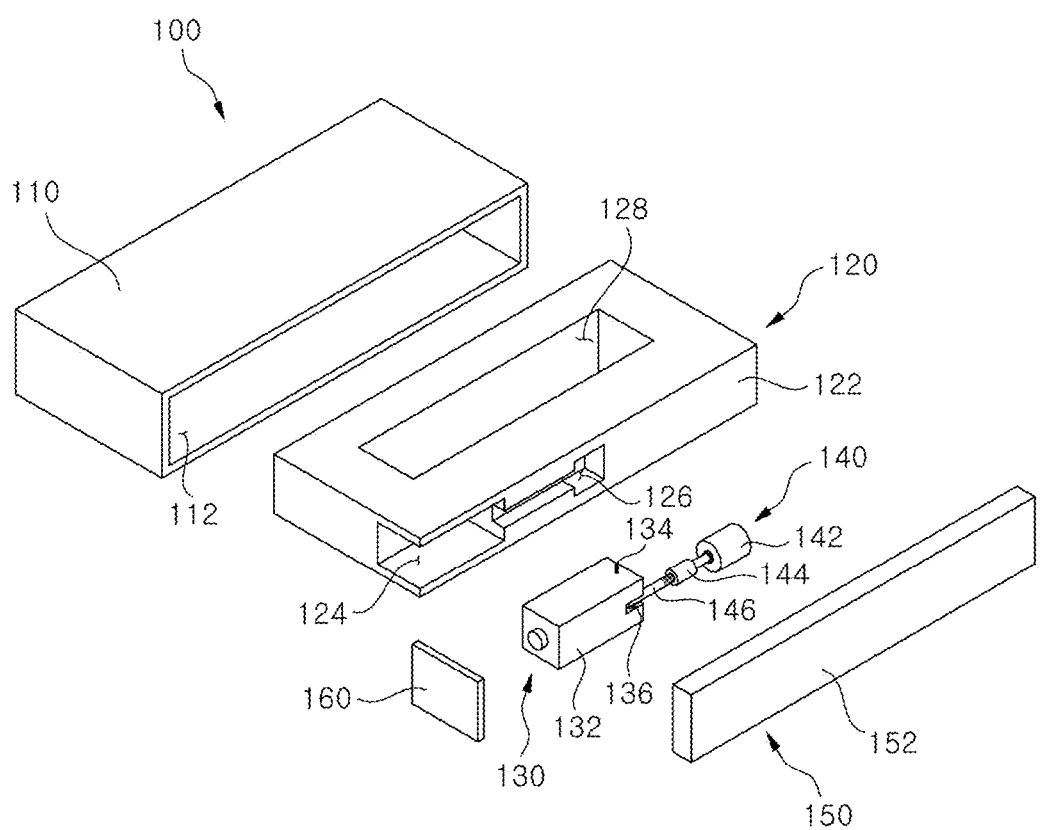
FIG. 12 is an exploded view illustrating a door handle of the vehicle according to another embodiment of the present disclosure.
Figure 13:
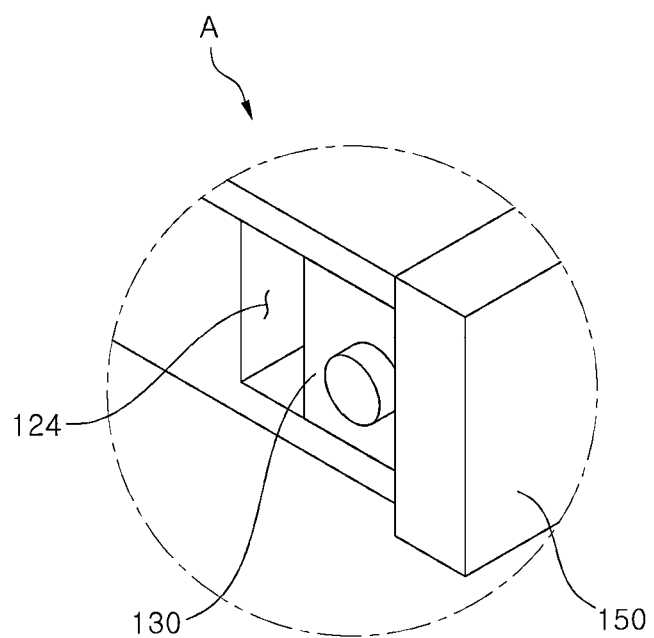
FIG. 13 is an enlarged view of the area A of FIG. 11.
Figure 14:
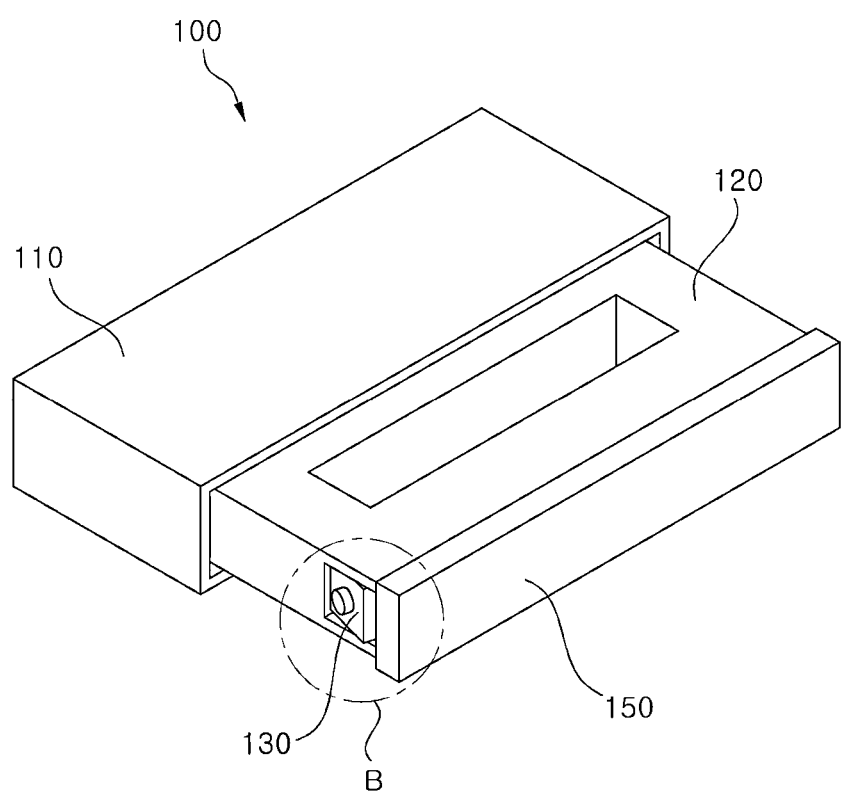
FIG. 14 is a view illustrating a state in which a camera of a door handle of the vehicle according to another embodiment of the present disclosure is rotated.
Figure 15:
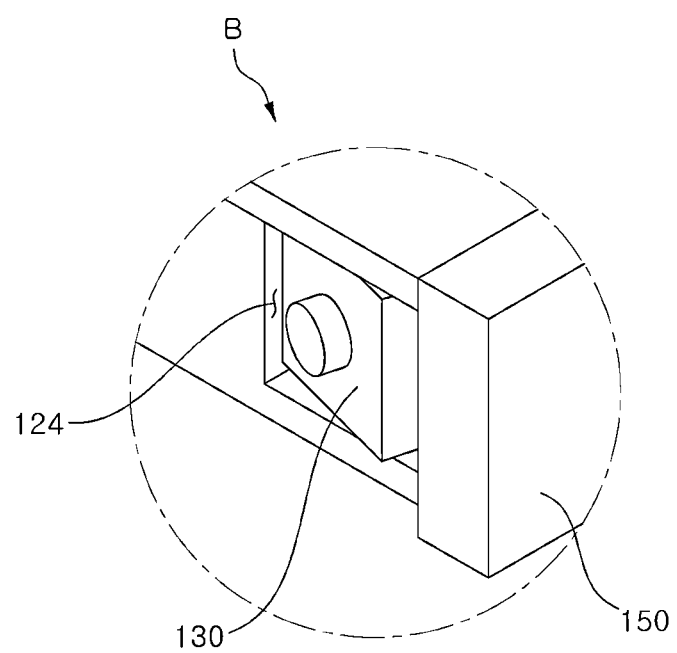
FIG. 15 is an enlarged view of the area B of FIG. 14.

Alternatively, as shown in FIG. 8, in a state in which the handle inner member 120 is inserted into the handle housing 110, if a motor is driven manually or automatically, the camera body 132 is rotated. As the camera body 132 rotates, the lens of the camera body 132 may be cleaned while the position where the lens of the camera body 132 in contact with the cleaner 160 is changed. More specifically, as shown in FIG. 8A, in a state in which the handle inner member 120 is inserted into the handle housing 110, as shown in FIG. 8B, when the motor is driven, the screw bar 146 may be moved in one direction to rotate the camera body 132. In addition, as shown in FIG. 8C, by driving the motor to rotate in the opposite direction, the screw bar 146 is moved in the other direction to rotate the camera body 132. As such, in a state in which the handle inner member 120 is inserted into the handle housing 110, by rotating the camera body 132, the lens of the camera body 132 may be cleaned by in contact with the cleaner 160.

The door handle 100 of the vehicle as described above may be respectively installed in the doors 200 on both sides of the vehicle, for example, may be installed in the door 200 on a driver seat side and the door 200 on a front passenger seat side, respectively. In addition, the camera module 130 may be disposed to photograph the rear side and rear left and right sides of the vehicle. Accordingly, when the driver drives the vehicle, the handle inner member 120 may protrude from the handle housing 110 according to the situation.

The door handle 100 may pop out (the handle inner member 120 protrudes from the handle housing 110) or retracted (the handle inner member 120 is inserted into the handle housing 110) based on a speed of the vehicle. For example, when the speed of the vehicle is 40 km/h or more, the door handle 100 may pop out.

Furthermore, when the driver turns on a turn signal switch, the door handle 100 at the corresponding position may pop out and the other door handle 100 may remain closed. For example, when the driver turns on a left turn signal switch, the left door handle 100 (driver seat side) pops out, and when the driver turns on a right turn signal switch, the right door handle 100 (front passenger side) pops out.

As described above, when the door handle 100 pops out, the camera module 130 is exposed through the pop-out of the door handle 100, so that an image captured by the camera module 130 may be displayed on a display installed inside the vehicle. The display installed inside the vehicle may be disposed on the left and right sides, respectively.

In addition, the door handle 100 may pop out according to a transmission position of the vehicle. For example, when a shift lever (or the transmission) of the vehicle is located in reverse R, the door handle 100 may pop up, and when the shift lever of the vehicle is located in parking P, the door handle 100 may be retracted.

Referring to FIGS. 9 to 15, the door handle 100 of the vehicle according to another embodiment of the present disclosure is described. The door handle 100 may include the handle housing 110, the handle inner member 120, the camera module 130, the motor module 140, the handle outer member 150, and the cleaner 160. While describing the door handle 100 of the vehicle according to another embodiment of the present disclosure, the same descriptions as in an embodiment have been omitted.

The handle housing 110 has a substantially rectangular parallelepiped shape and is formed in the insertion groove 112 on one surface thereof. In this embodiment, the handle housing 110 may have a relatively larger size than in the above embodiment, for example, the depth of the insertion groove 112 may be formed deeper than in the above embodiment.

The handle inner member 120 has a substantially rectangular shape and may include the inner body 122. The inner body 122 has a substantially rectangular shape, and as in the above embodiment, the camera mounting groove 124 and the motor insertion groove 126 are formed on one surface thereof, and a handle hole 128 may be formed in the middle thereof.

In this embodiment, the size of the inner body 122 may be larger than in the above embodiment, and the handle hole 128 may be formed in the middle of the inner body 122 to have a predetermined length and penetrate in the vertical direction. The handle hole 128 may have a length and width so that a user's hand may be inserted.

The camera mounting groove 124 may be formed at one end of the inner body 122, and may have a shape in which two surfaces of the inner body 122 are open. The camera module 130 may be installed in the camera mounting groove 124 to be rotated at a predetermined angle. In addition, the motor insertion groove 126 formed in the inner body 122 may be formed as in the above embodiment.

The camera module 130 is rotatably coupled to the camera mounting groove 124 of the inner body 122, and the camera module 130 in this embodiment is the same as in the above embodiment, so a detailed description has been omitted. However, the shape of the screw groove 136 formed in the camera body 132 of the camera module 130 may be modified as needed. For example, instead of the screw groove 136 being formed, a ring to which the screw bar 146 is coupled to the camera body 132 may be formed on the rear left and right sides of the camera body 132.

The motor module 140 is installed in the motor insertion groove 126 of the inner body 122. In this embodiment, the motor module 140 is the same as in the above embodiment, and accordingly a detailed description thereof has been omitted.

The handle outer member 150 is coupled to the handle inner member 120 to cover the handle inner member 120 so that the camera module 130 and the motor module 140 coupled to the handle inner member 120 are not exposed to the outside. In this embodiment, the handle outer member 150 may include the outer body 152.

The outer body 152 has a groove into which the handle inner member 120 may be inserted, and may have a substantially rectangular parallelepiped shape. In addition, a separate protrusion shape on the outer surface of the outer body 152 may be omitted.

In this embodiment, in a state in which the handle outer member 150 and the handle inner member 120 are coupled, the handle inner member 120 may be inserted into or protruded from the handle housing 110. In other words, the handle inner member 120 may slide and move in a depth direction of the insertion groove 112 in the handle housing 110 to be inserted into or protruded from the insertion groove 112. Herein, when the handle inner member 120 protrudes from the handle housing 110, the handle inner member 120 protrudes and moves from the handle housing 110 so that the handle hole 128 formed in the handle inner member 120 is completely exposed.

The cleaner 160 is disposed at one end of the insertion groove 112 of the handle housing 110, and may be disposed to clean the lens of the camera body 132. The cleaner 160 is the same as in the above embodiment, so a detailed description thereof has been omitted. The process of cleaning the lens of the camera body 132 using the cleaner 160 may be operated in the same manner as in the above embodiment.

As is apparent from the above, according to various embodiments of the present disclosure, the camera is mounted on the door handle of the vehicle and operates to be protruded while driving or parking, so that the driver may secure a field of view surroundings of the vehicle.

Further, various embodiments of the present disclosure may replace a side mirror of the vehicle that identifies the rear of the vehicle, so wind noise generated by the side mirror on which the vehicle is traveling may be eliminated, and improve aerodynamics and fuel efficiency because the door handle does not protrude from the side of the vehicle.

Further, according to various embodiments of the present disclosure, the lens of the camera may be cleaned when the door handle is accommodated in the outer panel of the door, so that foreign substances may be removed easily from the lens of the camera.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A door handle of a vehicle, the door handle comprising:
a handle housing installed on a door of the vehicle and including an insertion groove;
a handle inner member inserted into the insertion groove of the handle housing and configured to protrude from the insertion groove, wherein the handle inner member includes an inner body including a camera mounting groove;
a camera module installed on the handle inner member and configured to be exposed to an outside of the handle housing when the handle inner member protrudes from the insertion groove, wherein the camera module includes a camera body rotatably coupled to the camera mounting groove; and
a motor module connected to the camera body,
wherein when the inner body protrudes from the handle housing, the camera body rotates.

2. The door handle of claim 1, wherein the motor module is configured to rotate the camera module.

3. The door handle of claim 2, wherein the motor module comprises:
a motor body;
a link screw connected to the motor body and rotated by an operation of the motor body; and
a screw bar having a first end connected to the camera module and a second end connected to the link screw, the screw bar configured to move according to a rotation of the link screw.

4. The door handle of claim 3, wherein
a position at which the screw bar is coupled to the camera module is disposed to be spaced apart from a rotation axis of the camera module by a predetermined distance.

5. The door handle of claim 2, wherein
a motor insertion groove to receive the motor module is formed in the handle inner member.

6. The door handle of claim 1, wherein
the handle inner member has a predetermined length, and the camera module is disposed on one end of the handle inner member.

7. The door handle of claim 1, wherein
the handle inner member is further configured to operate to be protruded from the insertion groove in response to a speed of the vehicle when exceeding a predetermined speed.

8. The door handle of claim 1, wherein
the handle inner member is further configured to protrude from the insertion groove or maintain in an inserted state according to a signal of a turn signal switch of the vehicle.

9. The door handle of claim 1, wherein
the handle inner member is further configured to protrude from the insertion groove or maintain in an inserted state according to a position of a shift lever of the vehicle.

10. The door handle of claim 1, further comprising a handle outer member coupled to the handle inner member such that the camera module is not externally exposed thereto.

11. The door handle of claim 10, wherein the handle outer member further comprises:
an outer body in which a groove is formed to cover the handle inner member; and
an outer rotation protrusion formed to protrude from an outer surface of the outer body and caught on the handle housing;
wherein the outer body is configured to rotate about the outer rotation protrusion.

12. The door handle of claim 11, wherein
the handle inner member is configured to operate to be protruded from the insertion groove as the outer body rotates within the handle housing.

13. The door handle of claim 1, further comprising a cleaner installed inside the handle housing and configured to clean a lens of the camera module.

14. The door handle of claim 13, wherein
the camera module is installed in the handle inner member so that the lens of the camera module is rotated in a state in which the lens of the camera module is in contact with the cleaner.

15. The door handle of claim 1, wherein
the handle inner member is further configured to be rotated and protruded from the handle housing so as to expose the camera module.

16. The door handle of claim 1, wherein
the handle inner member is further configured to be slid and protruded from the handle housing so as to expose the camera module.

17. The door handle of claim 16, wherein
the handle inner member further includes a handle hole into which a hand of a user is inserted.

* * * * *